Figure 1:
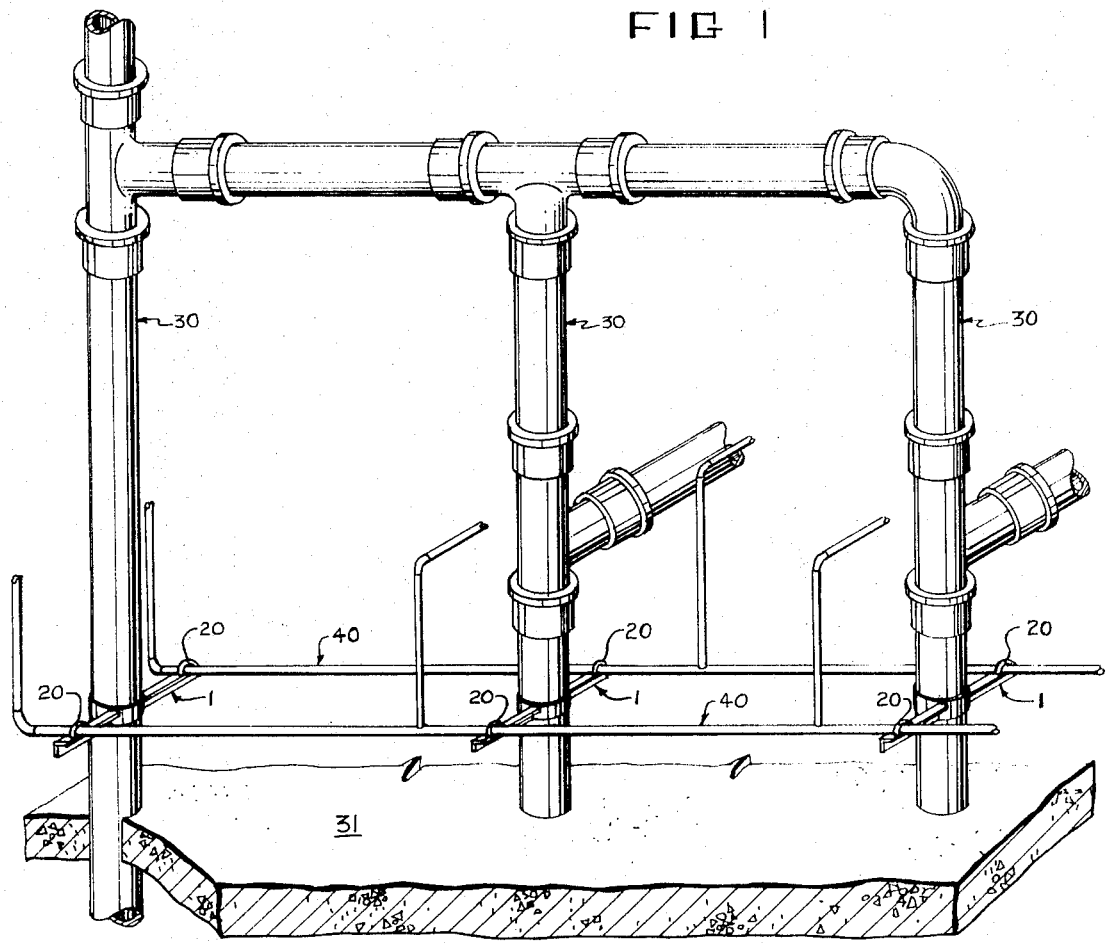

United States Patent

[11] 3,589,657

[72] Inventor Clyde M. Pendley
1767 De Foor Ave. N.W., Atlanta, Ga. 30318
[21] Appl. No. 824,870
[22] Filed May 15, 1969
[45] Patented June 29, 1971

[54] SUSPENDED CONDUIT SUPPORT BRACKET
7 Claims, 2 Drawing Figs.

[52] U.S. Cl. ................................................. 248/68, 248/221
[51] Int. Cl. .................................................. F16l 3/22
[50] Field of Search ...................................... 248/68, 74, 69, 221; 24/73.7

[56] References Cited
UNITED STATES PATENTS
| | | | | |
|---|---|---|---|---|
| 2,396,925 | 3/1946 | Morehouse | | 248/68 |
| 2,552,915 | 5/1951 | Zachrich | | 248/221 X |
| 3,159,708 | 12/1964 | Deal | | 24/73 X |
| 3,199,815 | 8/1965 | Martinkovic | | 248/221 X |
| 3,347,505 | 10/1967 | Menser | | 248/221 X |
| 3,385,545 | 5/1968 | Patton | | 248/68 |
| 3,404,858 | 10/1968 | Levy | | 248/68 |

Primary Examiner—Chancellor E. Harris
Attorney—Newton, Hopkins & Ormsby

ABSTRACT: This invention relates to a support bracket for use in supporting, spacing and aligning suspended conduits in relation to a self-supported conduit. More particularly, this invention includes a support bracket having a first clamping means for fastening to a self-supported conduit and a second clamping means for fastening to a suspended conduit with laterally adjustable means in a selected one of a plurality of laterally spaced positions.

PATENTED JUN29 1971 3,589,657

INVENTOR
CLYDE M. PENDLEY

3,589,657

SUSPENDED CONDUIT SUPPORT BRACKET

BACKGROUND OF THE INVENTION

Building construction usually includes a series of self-supporting drainage conduits and a series of suspended water conduits. It is a common practice in building construction to use some type of support mechanism to attach the suspended water conduits to the self-supporting drainage conduits. However, in the past most construction workers had to improvise miscellaneous hardware in order to attach suspended conduits to self-supporting conduits. Of the few support brackets available for this purpose, they were normally difficult to use, inefficient in strength and did not permit lateral adjustment of the suspended conduit relative to the self-supporting conduit. Also, where a copper conduit was used with a steel support bracket, a chemical reaction would occur causing destruction of the conduit and bracket.

OBJECTS OF THE INVENTION

It is therefore, a primary object of this invention to provide a support bracket for use in attaching suspended conduits to self-supporting conduits which would permit lateral adjustment of the suspended conduit relative to the self-supporting conduit.

A further object of this invention is to provide a conduit support bracket having insulating means for insulating a supported pipe relative to the support bracket.

A still further object of this invention is to provide a conduit support bracket having easily assembled clamping means complimentary in shape to the associated conduits.

An additional object of this invention is to provide a conduit support bracket economical of manufacture, simple of construction and reliable in supporting strength.

Still other objects and advantages will become apparent in the details of construction in reading the accompanying specification with reference to the attached drawing, showing one illustrative embodiment of the invention, and wherein like reference characters are used to refer to like parts throughout the Figures of the drawing wherein:

BRIEF DESCRIPTION OF THE FIGURES OF DRAWINGS

Figure 2:
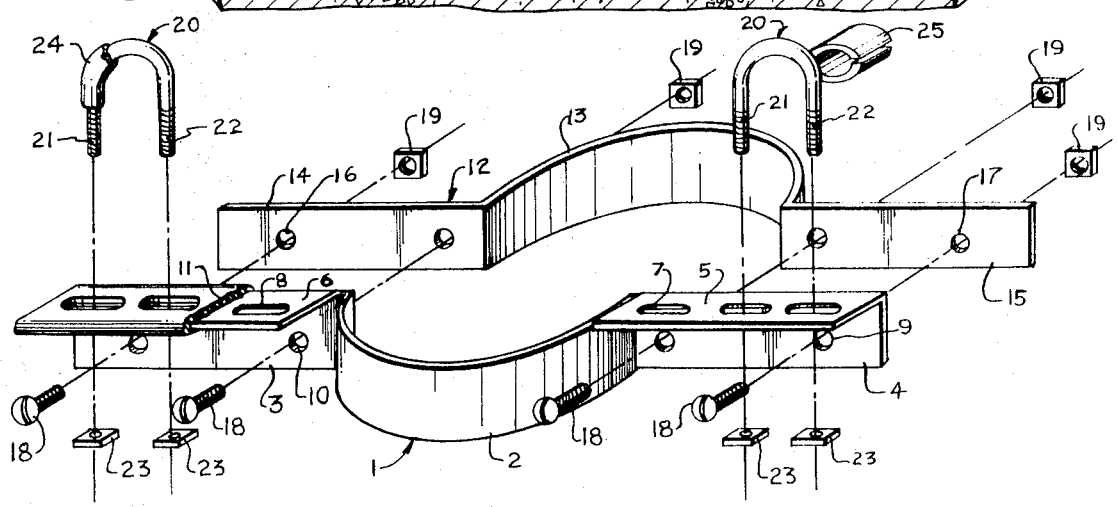

FIG. 1 is a perspective view of a building construction showing the use of the support bracket in combination with a series of self-supporting conduits and a series of suspended conduits; and FIG. 2 is an exploded perspective view showing the details of construction of the support bracket.

DESCRIPTION OF ILLUSTRATIVE EMBODIMENT

Referring to FIG. 1 of the drawing, the invention will be described with reference to a support bracket 1 for use in attaching a series of suspended conduits 40 to a series of self-supporting conduits 30.

Referring now particularly to FIG. 2, the support bracket 1 includes a first supporting surface consisting of a U-shaped support element 2 having a pair of radially extending support elements 3,4. The support elements 3,4, are integrally formed with the U-shaped semicircular support element 2 with one of the support elements 3,4, projecting outward from each leg of the U-shaped support element 2. The support elements 3,4, are detailed in arrangement such that they are coplanar or extend—radially substantially 180° apart.

Formed integral with a top edge of each of the support elements 3,4, is a plate element 5,6, respectively, which project from elements 3,4, toward the base of U-shaped support 2. The plate elements 5,6, are detailed in arrangement to define an angle of substantially 90° between plate elements 5,6, and its associated support element 3,4. Plate elements 5,6, are also coplanar in arrangement and define second supporting surfaces disposed at a 90° angle relative to the supporting surface of U-shaped element 2. The surfaces of plate elements 5,6, are provided with a series of elongated openings 7,8 for the purpose of receiving a suspended conduit clamp 20 which will be described hereinbelow.

The support bracket 1 is attached to a self-supporting conduit 30 by means of a clamp 12 which includes a U-shaped or semicircular element 13 having a pair of radially extending clamping plates 14,15. Clamping plates 14,15, are coplanar and are detailed in design to be complimentary to support elements 3,4. Clamping plates 14,15, are provided with a series of openings 16,17, which are complimentary to a series of openings 9,10, provided on support elements 3,4. U-shaped element 2 and U-shaped clamping element 13 are detailed in design to be complimentary about self-supported conduit 30. Attachment of support bracket 1 to a conduit 30 is effected by placing support elements 3,4 in parallel relationship with clamping plates 14,15, respectively and with U-shaped clamping elements 2,13, surrounding conduit 30. A series of bolts 18 is then inserted through openings 9, 10, 16, and 17, with a nut 19, threaded on the extended end of each of the bolts 18.

A suspended conduit 40 is secured to support bracket 1 by a U-bold 20, which includes a pair of leg members 21, 22, detailed in design to be inserted through elongated openings 7,8, provided on supporting surfaces 5,6. The U-bolt is held in place by threading a nut 23 on each of the leg members 21,22, on the underside of surfaces 5,6.

The plate elements 5,6, may be insulated from the suspended conduits 40 to prevent galvanic erosion therebetween. Two means for providing this insulation are shown in FIG. 2, one on the element 6 and bolt 20, and another for use with element 5. It is to be understood that both element 5 and element 6 would normally have like insulating means, but are shown in FIG. 2 different for illustration only.

The insulating means on element 6 include a conventional insulating coating 11 and an insulating coating 24 on that portion of bolt 20 in contact with the suspended conduit 40. Therefore it will be seen that when the conduit 40 is clamped between plate element 6 and bolt 20, there will be insulation at all contact points between bolt 20, element 6 and conduit 40.

The insulation means for element 5 in FIG. 2 includes a split annulus 25 of conventional flexible insulating material. Annulus 25 is positioned around that portion of conduit 40 that will be in contact with bolt 20, and plate element 5 to prevent galvanic contact therebetween.

OPERATION

In installing suspended water conduits 40, in a building construction, a worker would first select the number of support brackets 1, and clamp 12 needed. He would then clamp the brackets 1 to self-supporting conduits 30 at a desired location by means of nut and bolts 18,19. The suspended conduits 40 would then be placed on top of supporting surfaces 5,6. The suspended conduits 40 are secured to brackets 1 by placing a U-bolt 20 around suspended conduit 40 and inserting leg members 21,22 through elongated openings 5,6, and then threading nuts 23 onto leg members 21,22. Vertical adjustment of the suspended conduit 40 relative to supporting conduit 30 is accomplished by sliding U-shaped clamping elements 2,13, vertically on conduit 30 to a desired location and then tightening nut and bolts 18,19. Lateral adjustment of the suspended conduit 40 relative to supporting conduit 30 is accomplished by placing the suspended conduit in a selected lateral location with the U-bolt leg members 21,22, inserted through the elongated opening 7, 8, at the selected lateral location and then tightening nuts 23.

The suspended conduit 40 can be insulated from support bracket 1 either by covering the supporting surfaces 5,6, and a portion of U-bolt 20 with an insulating material 11,24, or by providing an insulating bushing 25 to be placed around the suspending conduit in the area to be clamped by U-bolt 20.

It is now evident that the herein described illustrative embodiment is capable of accomplishing the above-stated objects of the invention. However, it is obvious that various modifications may be made in the details of construction by those skilled in the art without departing from the spirit of the invention.

I claim:

1. A support bracket for use in supporting, spacing and aligning suspended conduits in relation to a self-supported conduit comprising:
   a. a support element defining a first substantially U-shaped supporting surface and a second substantially flat supporting surface with the plane of said U-shaped supporting surface being disposed at an angle relative to said flat supporting surface;
   b. first adjustable clamping means operatively associated with said U-shaped supporting surface for securing said first surface to said self-supported conduit;
   c. second adjustable clamping means operatively associated with said flat supporting surface for securing said suspended conduit to said flat supporting surface;
   d. adjusting means provided on said flat supporting surface for adjusting the lateral spacing of said suspended conduit relative to said self-supported conduit;
   e. said support element including two substantially flat coplanar supporting surfaces each said flat supporting surface extending radially outward from said U-shaped supporting surface, said two flat supporting surfaces being disposed substantially 180° apart; and
   f. insulating means operatively associated with said two flat supporting surfaces and said associated clamping means for insulating said suspended conduit relative to said support bracket;
   g. said support bracket being further characterized in that each of said second supporting surfaces consists of a pair of integrally formed first plate elements formed and disposed in such a manner as to define substantially a 90° angle therebetween with the corresponding plate element of each pair being in a coplanar relationship.

2. A support bracket as defined in claim 1 further characterized in that said U-shaped adjustable clamping means consist of a U-shaped portion having in extending second plate element projecting laterally outward from each end of said U-shaped portion with said laterally extending second plate elements being in a coplanar relationship, said support bracket and said U-shaped clamping portion being detailed when in a clamped and supporting relationship such that said laterally projecting second plate elements are disposed in a parallel relationship with one coplanar pair of said first plate elements, and wherein said parallel pairs of first and second plate elements are provided with aligned openings for receiving adjustable nut and bolt fastening means.

3. A support bracket as described in claim 2 further characterized in that said flat supporting surface lateral adjusting means consists of a series of elongated openings for receiving an adjustable U-bolt at a plurality of laterally spaced positions.

4. A support bracket as defined in claim 3 further characterized in that said support bracket includes an insulating bushing detailed to fit around said suspended conduit and to fit within said adjustable U-bolt to thereby insulate said suspended conduit from said support bracket.

5. A support bracket as defined in claim 4 further characterized in that said support element includes two substantially flat coplanar supporting surfaces, with one of said flat supporting surfaces extending radially outward from each leg portion of said U-shaped supporting surface and wherein said two flat supporting surfaces are disposed substantially 280° apart.

6. A support bracket for use in supporting, spicing and aligning suspended conduits in relation to a self-supported conduit comprising:
   a. a support element defining a first substantially U-shaped supporting surface and a second substantially flat supporting surface with the plane of said U-shaped supporting surface being disposed at an angle relative to said flat supporting surface;
   b. first adjustable clamping means operatively associated with said U-shaped supporting surface for securing said first surface to said self-supported conduit;
   c. second adjustable clamping means operatively associated with said flat supporting surface for securing said suspended conduit to said flat supporting surface;
   d. adjusting means provided on said flat supporting surface for adjusting the lateral spacing of said suspended conduit relative to said self-supported conduit;
   e. said support element including two substantially flat coplanar supporting surfaces, each said flat supporting surface extending radially outward from said U-shaped supporting surface, said two flat supporting surfaces being disposed substantially 180° apart; and
   f. said support bracket being further characterized in that each of said second supporting surfaces consists of a pair of integrally formed first plate elements formed and disposed in such a manner as to define substantially a 90° angle therebetween, with the corresponding plate element of each pair being in a coplanar relationship.

7. A support bracket as described in claim 6 further characterized in that said flat supporting surface lateral adjusting means consists of a series of elongated openings for receiving an adjustable U-bolt at a plurality of laterally spaced positions.